W. E. COPITHORN.
AUTOMOBILE TIRE.
APPLICATION FILED MAR. 21, 1912. RENEWED MAR. 10, 1915.
1,136,892.
Patented Apr. 20, 1915.
2 SHEETS—SHEET 1.
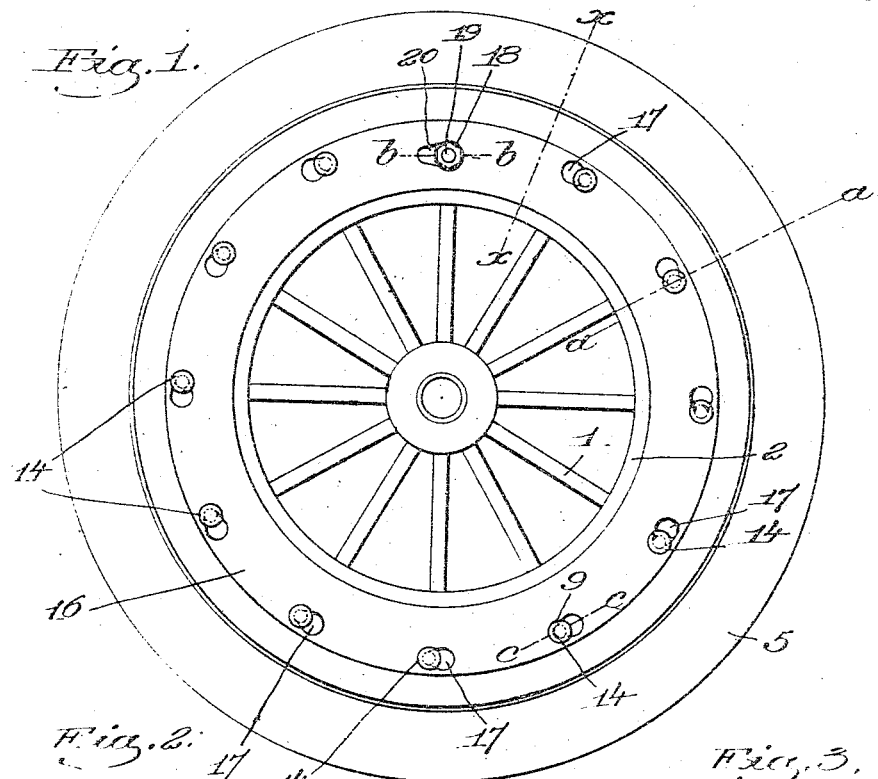
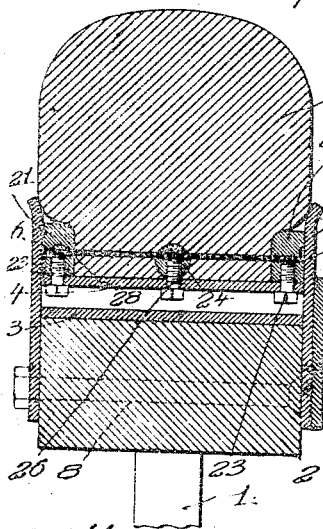
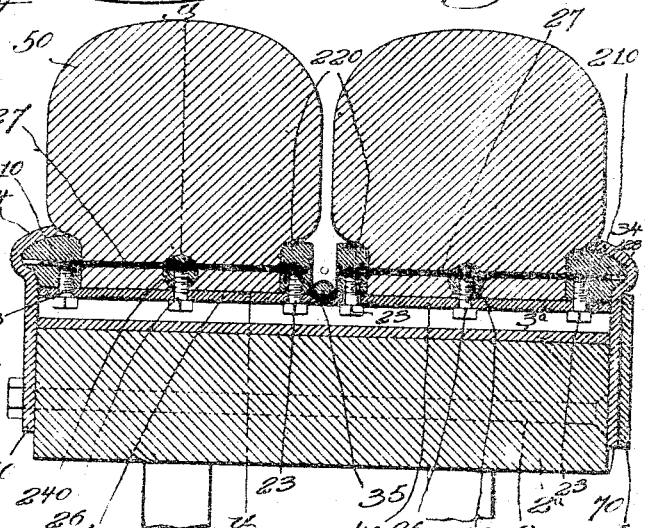
Witnesses:
Fred. S. Greenleaf
Warren O'Neil
Inventor:
Walter E. Copithorne,
by Edwards Hewlett Smith

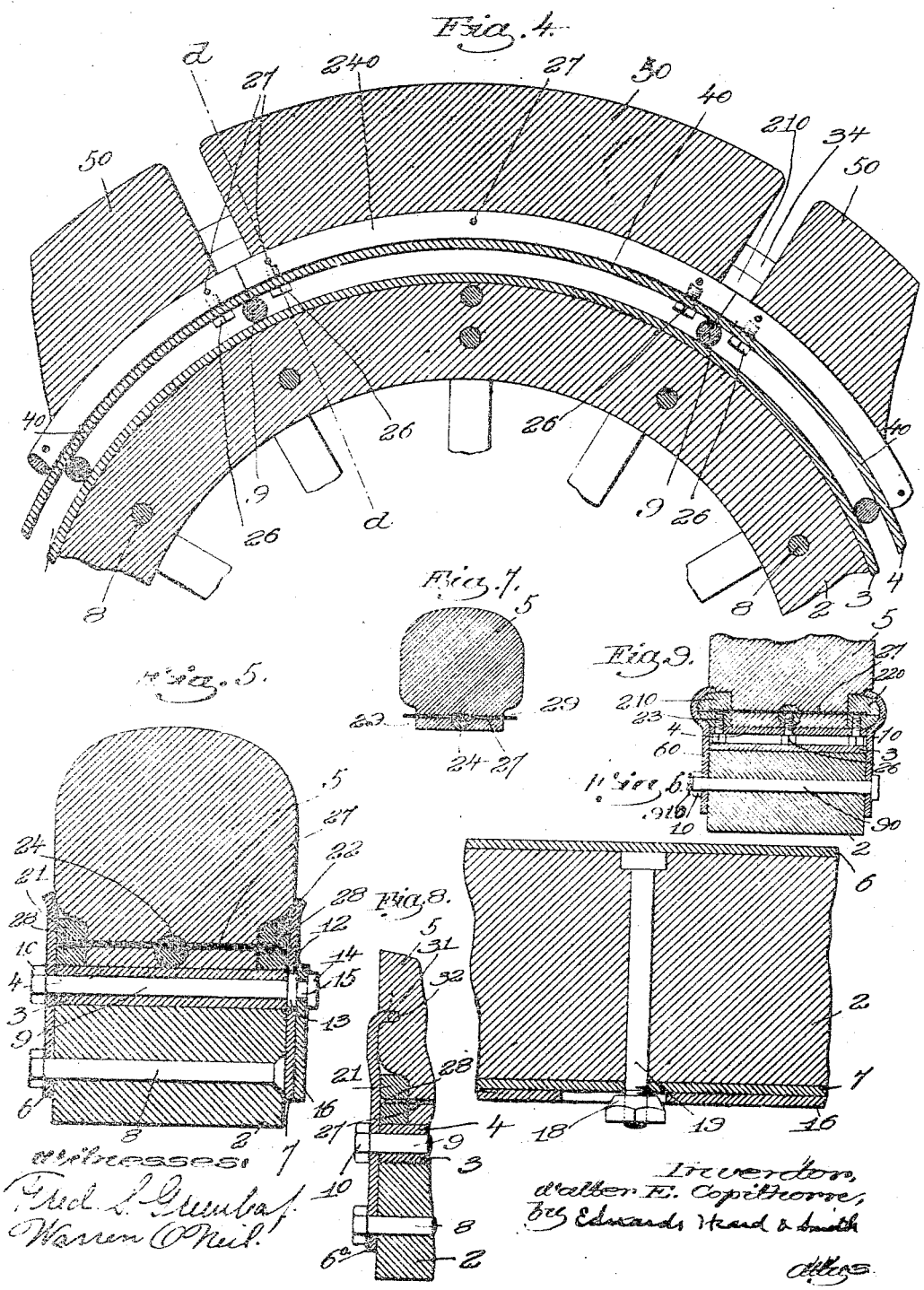

UNITED STATES PATENT OFFICE.

WALTER E. COPITHORN, OF NATICK, MASSACHUSETTS.

AUTOMOBILE-TIRE.

1,136,892.    Specification of Letters Patent.    Patented Apr. 20, 1915.

Application filed March 21, 1912, Serial No. 685,200. Renewed March 10, 1915. Serial No. 13,502.

*To all whom it may concern:*

Be it known that I, WALTER E. COPITHORN, a citizen of the United States, residing at Natick, county of Middlesex, State of Massachusetts, have invented an Improvement in Automobile-Tires, of which the following description, in connection with the accompanying drawing, is a specification, like characters on the drawing representing like parts.

This invention relates to automobile wheels, and especially to that type of wheel having a demountable rim.

The object of the invention is to provide an improved demountable rim especially adapted for use in connection with a solid rubber tire, and also to provide a novel means of fastening the solid rubber tire to the rim.

The features wherein my invention resides will be more fully hereinafter described and then pointed out in the appended claims.

Referring to the drawings, Figure 1 is a side view of a wheel embodying my invention; Fig. 2 is an enlarged section on the line $x$—$x$, Fig. 1; Fig. 3 is a similar section of a wheel having a double tread tire; Fig. 4 is a section on the line $y$—$y$, Fig. 3; Fig. 5 is an enlarged section on the line $a$—$a$, Fig. 1; Fig. 6 is an enlarged section on the line $b$—$b$, Fig. 1; Fig. 7 is a sectional view through the rubber tread; Fig. 8 is a fragmentary sectional view showing a modified form of the invention; Fig. 9 is a sectional view showing a different embodiment of the invention; Fig. 10 is an enlarged section through the locking ring on the line $c$—$c$, Fig. 1.

1 designates a wheel body of any suitable or usual construction provided with a felly 2 and a felly band 3.

4 is the demountable rim to which the solid rubber tire 5 is secured. The demountable rim is held in place between two side plates 6 and 7 which are secured to the felly 2, the side 7 being removable and constituting a clamping ring, while the side plate 6 is preferably permanently fixed to the felly and constitutes a positioning ring. These side plates are shown as annular in form and they may be secured to the felly 2 in a variety of ways. I have illustrated herein for this purpose a construction similar to that shown in my co-pending application Se. No. 676233, filed February 8, 1912.

8 designates bolts or rivets which extend through the felly 2 and the positioning ring 6 and which firmly secure said ring to the felly.

9 designates bolts which are situated exterior to the felly band 3 and contact therewith and rest thereagainst, said bolts extending through the positioning ring 6 and having nuts 10 applied thereto, and also being of a length to extend through the clamping ring 7, the latter being provided with suitable apertures 12 to receive the bolts 9. The ends of the bolts 9 which extend through the clamping ring 7 are provided with the collars 13 which rest against the side of the felly band 3, and with the head 14 which is separated from the collar 13 to form a groove 15.

16 is a locking ring provided with tapered apertures 17, said apertures at their larger ends being of a diameter to fit over the heads 14. This locking ring 16 holds the clamping ring 7 in place, and in applying the locking ring the heads 14 are inserted through the large ends of the apertures 17 and then the ring is turned to bring the small ends of the apertures 17 behind the heads 14, this turning movement of the locking ring being accomplished by the action of a tapered nut 18 which has screw-threaded engagement with a bolt 19 anchored in the felly 2 or to the felly band, and which operates in a tapered slot 20 formed in the locking ring, but tapering in the opposite direction from the slots or apertures 17.

The construction next above described is similar to that described and claimed in my said co-pending application.

I may if desired make the locking ring 16 with the portions 92 adjacent the slots 17 of progressively varying thickness, as seen in Fig. 10, so that when the locking ring is turned it will wedge in behind the heads 14.

The demountable rim 4 encircles the bolts 9 and this demountable rim may be made either of a single piece or may be made in sections according to whether the rubber tread is a continuous tread, or a sectional one. In Figs. 2 and 5 I have shown a continuous demountable rim, while in Figs. 3 and 4 I have shown a sectional demountable rim. Referring first to the construction involving the continuous tread the rubber tread 5 is received between two retaining rings 21 and 22, which encircle the demountable rim 4 and are detachably secured thereto in some suitable way, as by means of screws 23 that are inserted from the inner side of the demountable rim. The rubber tread has embedded therein an annular wire 24 which is situated at the base of the tread and may be placed therein when the tread is being formed. This ring 24 is also detachably secured to the demountable tread by means of screws 26. 27 designates twisted wires or rods which are embedded in the tread 5 and extend through and are welded to the ring 24, the ends of said rods projecting beyond the base portion of the tread and entering recesses 28 formed in the retaining rings 21, 22. The rods or wires 27 and the ring 24 will be incorporated in the tread portion while the latter is being made, as seen in Fig. 7.

In assembling the tire and demountable rim the retaining ring 21 may first be secured to the demountable rim by the screws 23 and then the rubber tread 5 may be put in place with the ends of the wires 27 entering the recesses 28 in the ring 21, and after the tire is secured in place by inserting the screws 26 the other retaining ring 22 is put into place with the ends of the rods 27 entering the recesses 28 therein. Said ring 22 is then secured in place by the screws 23. The tread 5 and demountable rim are thus firmly secured together and may be applied to the wheel and then clamped in place thereon by the clamping ring 7 and locking ring 16.

It will be noted that in the above construction the screws 23 and 26 which secure the retaining rings and the ring 24 to the demountable rim 4 are inserted from the interior of the said rim, and moreover that the wires or rods 27 are situated a sufficient distance from the interior face of the tread so that they have a firm hold therein.

I prefer to make the rubber tread 5 with the grooves 29 in which the retaining rings 21 and 22 are received, so that the outer edges of said retaining rings come substantially flush with the sides of the tread. I also preferably make the positioning ring 6 and the clamping ring 7 of sufficient size so that the outer edges thereof will overly the retaining rings 21 and 22 and extend somewhat beyond said rings, as clearly seen in Figs. 2 and 5. The particular size of the positioning and clamping rings, however, is not essential to the invention.

In Fig. 8 I have shown an embodiment where the positioning ring 6ª not only extends beyond the retaining rings 21 and 22, but is formed at its outer edge with the inwardly-bent flange 31 which enters an annular groove 32 formed in the side of the tread 5. By means of this construction the positioning ring assists in holding the tread of the tire in place. The clamping ring may have the same construction.

In Figs. 3 and 4 I have shown an embodiment of the invention where the demountable rim and the tread are made in sections and where this is done the clamping and positioning rings are made to co-act with the separate sections to hold them firmly against the felly band. Where the sectional construction is employed I will preferably make the demountable rim with the same number of sections as there are in the rubber tread so that each tread section and its demountable rim section constitute an entity which can be removed from the wheel without disturbing any of the other sections. In Fig. 4, for instance, the tread sections are designated by 50 and the demountable rim sections by 40. The demountable rim sections are arranged end to end so that when they are in place they constitute a complete demountable rim. I will preferably so place these demountable rim sections 40 on the tire so that the ends thereof will rest on the bolts 9, and the bolts 9, therefore, will support the meeting ends of two adjacent rim sections. Each tread section 50 is secured to its rim section by means similar to that illustrated in Figs. 2 and 5, that is, each tread section has embedded therein a length of wire 240 which is secured to the rim section 40 by screws or bolts 26 and each demountable rim section 40 has secured thereto two clamping ring sections 210 and 220 between which the tread section 50 is received, said retaining ring sections being secured to the rim section 40 by screws 23. Each tread section 50 also has embedded therein a plurality of wires or rods 27 which extend through the ring section 240 and the ends of which extend into apertures in the retaining ring sections 210 and 220. The positioning ring 60 at one side of the felly 2 is provided at its outer edge with the lip or flange 34 which embraces the retaining ring sections 210, the latter being made of a shape to fit the flange 34. This flange 34 thus holds the separate tire sections firmly against the bolts 9. The clamping ring 70 at the other side of the tire will be made with a similar flange 34 to embrace the other clamping ring sections. Where the invention is embodied in a dual tire, as shown in Fig. 3, the inner edges of the demountable rim sections 40 will be engaged by an annular hoop or ring 35 which holds the inner edges of said rim sections firmly against the bolts 9. The ring or hoop 35, together with the flanges 34 on the positioning and clamping rings 60 and 70 serve to hold the separate sections firmly in place. In this embodiment the clamping ring 70 also has the function of clamping the demountable ring sections firmly against the positioning ring 60.

If the sectional construction is embodied in a tire having a single tread surface, then both of the retaining ring sections would have the shape of the retaining ring sections 210, as shown in Fig. 9. Where the double tread structure is used, I prefer to arrange the sections in the two treads so that they will break joints.

In Fig. 9 I have shown a construction wherein the locking ring is eliminated and the clamping ring 70 performs the function of both a locking ring and a clamping ring. In this embodiment the bolts 90 which hold the ring 70 in place extend through the felly 2 instead of being situated exterior to the felly band as in the other figures, and the combined clamping and locking ring 70 will be provided with tapered slots 17 similar to those shown in the locking ring 16 in Fig. 1, and with a reversely-tapered slot 20 in which the cone nut 18 operates. The operation of applying or removing the ring 70 will be the same as above described with reference to the locking ring 16. The bolts 90 are shown as extending beyond the nuts 10 thereon and as provided with cotter pins 910 which are situated so as to permit the nuts to be backed off one or two threads. In removing the ring 70 the nuts 10 will first be loosened so as to loosen the clamping pressure of the bolts 90 on the ring 70, and then said ring will be turned into a position to permit it to be removed from the bolts. In applying the ring 70, the nuts 10 will be tightened up after said ring has been put in place thereby to clamp the ring firmly against the retaining rings. Where the headed bolts are located in the felly 2, as in Fig. 9, the demountable rim will preferably be of such a size that the heads of the screws 23 and 26 will rest on the felly band 3.

While I have herein shown some embodiments of the invention, I do not wish to be limited to the constructional features illustrated as many changes may be made without departing from the invention.

Having fully described my invention, what I claim as new and desire to secure by Letters Patent is:—

1. In a wheel, the combination with a wheel body, of a demountable rim therefor, a tread member on said rim, retaining rings separable from said rim and detachably secured thereto, one on each side of the tread member, said retaining rings having apertures, and projections extending laterally from the tread member and entering the apertures in the retaining rings, said projections being freely withdrawable from the apertures when the retaining rings are removed.

2. In a wheel, the combination with a wheel body, of a demountable rim therefor, a tread member on said rim, a retaining ring detachably secured to the rim at each side thereof, said rings embracing the sides of the tread member and provided with apertures, and rods extending transversely through the tread member and having their ends entering said apertures but freely withdrawable therefrom when the retaining rings are removed.

3. In a wheel, the combination with a wheel body, of a demountable rim therefor, a tread member on said rim, retaining rings encircling the rim and embracing the sides of the tread member, said retaining rings having sockets, projections extending laterally from the tread member and entering said sockets in the retaining rings, and means to detachably secure one of the retaining rings to the demountable rim, the projections being freely withdrawable from said ring when it is removed.

4. In a wheel, the combination with a demountable rim, of a tread member thereon, a ring embedded in the tread member, rods secured to said ring and extending transversely of the tread member and projecting beyond the sides thereof, and retaining rings embracing the sides of the tread member and provided with apertures into which the projecting ends of the rods freely enter and means to connect the retaining rings detachably to the rim, said rings being separable from the tread member.

5. In a wheel, the combination with a demountable rim, of a tread member thereon, a ring embedded in the tread member, rods secured to said ring and extending transversely of the tread member and projecting beyond the latter at each side, retaining rings separate from the demountable rim and embracing the sides of but separate from the tread member, said retaining rings having apertures to receive the projecting ends of the rods, and means to detachably secure the retaining rings to the tread member.

6. In a wheel, the combination with a wheel body, of a demountable rim encircling the body and having a diameter larger than the body so that said rim is spaced from the periphery thereof, a retaining ring encircling said rim at each side thereof, a tread member on said rim between the retaining rings, said retaining rings being provided with apertures, rods extending transversely of said tread member and extending beyond the latter, the projecting portions of said rods entering the apertures in the retaining rings, bolts extending through the demountable rim and into the retaining rings to secure the latter to the former, the heads of said bolts occupying the space between said rim and wheel body.

7. In a wheel, the combination with a wheel body, of a sectional demountable rim encircling the body and having a diameter larger than the body so that said rim is spaced from the periphery thereof, bolts extending transversely of the body exterior thereto on which the ends of the sections of the demountable rim are supported, a retaining ring detachably secured to said demountable rim at each side thereof, a sectional tread member on the demountable rim between the retaining rings, the latter being provided with apertures, rods extending transversely of the tread member sections and projecting beyond the latter, the projecting portions of said rods loosely entering the apertures in the retaining rings.

In testimony whereof, I have signed my name to this specification, in the presence of two subscribing witnesses.

WALTER E. COPITHORN.

Witnesses:
LOUIS C. SMITH,
THOMAS J. DRUMMOND.